(12) United States Patent
Wang

(10) Patent No.: US 9,392,223 B2
(45) Date of Patent: Jul. 12, 2016

(54) METHOD FOR CONTROLLING VISUAL LIGHT SOURCE, TERMINAL, AND VIDEO CONFERENCE SYSTEM

(71) Applicant: Huawei Technologies Co., Ltd., Shenzhen (CN)

(72) Inventor: Rongze Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 14/318,922

(22) Filed: Jun. 30, 2014

(65) Prior Publication Data

US 2014/0313279 A1     Oct. 23, 2014

Related U.S. Application Data

(63) Continuation of application No. PCT/CN2012/084634, filed on Nov. 15, 2012.

(30) Foreign Application Priority Data

Dec. 31, 2011 (CN) .......................... 2011 1 0459491

(51) Int. Cl.
H04N 7/14 (2006.01)
H04N 7/15 (2006.01)
H05B 37/02 (2006.01)

(52) U.S. Cl.
CPC ................. *H04N 7/15* (2013.01); *H04N 7/147* (2013.01); *H05B 37/0227* (2013.01); *H05B 37/0245* (2013.01)

(58) Field of Classification Search
USPC ............ 348/14.01, 14.07, 14.08, 14.09, 14.1, 348/602, 14.16, 52, 142, 208.14, E13.031
See application file for complete search history.

(56) References Cited

U.S. PATENT DOCUMENTS

| | | | | |
|---|---|---|---|---|
| 2006/0023949 A1* | 2/2006 | Saito et al. | ......... | G06K 9/00355 382/217 |
| 2008/0133640 A1 | 6/2008 | Saito et al. | | |
| 2008/0144876 A1* | 6/2008 | Reining et al. | ......... | H04R 5/027 381/369 |

FOREIGN PATENT DOCUMENTS

| | | |
|---|---|---|
| CN | 1907583 A | 2/2007 |
| CN | 1981525 A | 6/2007 |

(Continued)

OTHER PUBLICATIONS

Partial English Translation and Abstract of Chinese Patent Application No. CN102612205A, Aug. 26, 2014, 3 pages.

(Continued)

*Primary Examiner* — Yosef K Laekemariam
(74) *Attorney, Agent, or Firm* — Conley Rose, P.C.; Grant Rodolph

(57) ABSTRACT

A method for controlling a visual light source, a terminal, and a video conference system are provided that relate to the field of communications technologies. The method for controlling a visual light source includes: when a first terminal and a second terminal are in a video conference state, receiving, by the first terminal, control information sent by the second terminal; controlling, by the first terminal according to the control information, a first visual light source on a local rotatable platform to rotate, so that a target indicated by the first visual light source is consistent with a target displayed by a display corresponding to the second terminal. Embodiments of the present invention improve user experience of participants in a video conference.

20 Claims, 6 Drawing Sheets

(56) References Cited

FOREIGN PATENT DOCUMENTS

| CN | 101251784 A | 8/2008 |
|---|---|---|
| CN | 101610296 A | 12/2009 |
| CN | 101699858 A | 4/2010 |
| CN | 102196087 A | 9/2011 |
| CN | 102612205 A | 7/2012 |
| WO | 2011046448 A1 | 4/2011 |
| WO | 2011074974 A1 | 6/2011 |

OTHER PUBLICATIONS

Partial English Translation and Abstract of Chinese Patent Application No. CN1907583A, Sep. 22, 2014, 17 pages.
Partial English Translation and Abstract of Chinese Patent Application No. CN101251784, Sep. 22, 2014, 11 pages.
Partial English Translation and Abstract of Chinese Patent Application No. CN102196087A, Part 1, Sep. 22, 2014, 6 pages.
Partial English Translation and Abstract of Chinese Patent Application No. CN102196087, Part 2, Sep. 22, 2014, 6 pages.
Foreign Communication From a Counterpart Application, Chinese Application No. 201110459491.2, Chinese Office Action dated Oct. 21, 2013, 8 pages.
Foreign Communication From a Counterpart Application, PCT Application No. PCT/CN2012/084634, English Translation of International Search Report dated Feb. 28, 2014, 3 pages.
Foreign Communication From a Counterpart Application, PCT Application No. PCT/CN2012/084634, English Translation of Written Opinion dated Feb. 28, 2014, 8 pages.

* cited by examiner

METHOD FOR CONTROLLING VISUAL LIGHT SOURCE, TERMINAL, AND VIDEO CONFERENCE SYSTEM

CROSS-REFERENCE TO RELATED APPLICATIONS

This application is a continuation of International Application No. PCT/CN2012/084634, filed on Nov. 15, 2012, which claims priority to Chinese Patent Application No. 201110459491.2, filed on Dec. 31, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method for controlling a visual light source, a terminal, and a video conference system.

BACKGROUND

A video conference system, also called a video-conferencing system, refers to a system in which two or more individuals or groups at different places transmit a sound, video, or file to each other by using a transmission line or a multimedia device, to implement real-time and interactive communication, so as to achieve an objective of conferencing.

When two sides of a video conference are faced with some communications where a material object is shown, generally a local participant communicates with a remote participant by using a visual light source, for example, a laser pointer, to indicate a local target material object, while the remote participant can only conduct communication relevant to the material object with the local participant by talking.

However, sometimes some specific parts of the material object are difficult to be described by talking; when the remote participant wants to express a comment about these parts, description by talking is difficult to make the participant on the other side understand a precise position that the remote participant wants to indicate, and therefore a communication obstacle is caused, reducing user experience of the participants in the video conference.

SUMMARY

In order to improve user experience of participants in a video conference, embodiments of the present invention provide a method for controlling a visual light source, a terminal, and a video conference system. The technical solutions are as follows:

According to one aspect, a method for controlling a visual light source is provided, including: when a first terminal and a second terminal are in a video conference state, receiving, by the first terminal, control information sent by the second terminal; and controlling, by the first terminal according to the control information, a first visual light source on a local rotatable platform to rotate, so that a target indicated by the first visual light source is consistent with a target displayed by a display corresponding to the second terminal.

According to another aspect, a terminal is provided, including: a receiving module configured to, when a first terminal and a second terminal are in a video conference state, receive control information sent by the second terminal; and a controlling module configured to control, according to the control information, a first visual light source on a local rotatable platform to rotate, so that a target indicated by the first visual light source is consistent with a target displayed by a display corresponding to the second terminal.

A video conference system includes a first terminal and a second terminal, where the first terminal is configured to obtain control information sent by the second terminal; and control, according to the control information, a first visual light source on a local rotatable platform to rotate, so that a target indicated by the first visual light source is consistent with a target displayed by a display corresponding to the second terminal.

A beneficial effect brought by the technical solutions provided by the embodiments of the present invention is that when a first terminal and a second terminal are in a video conference state, the first terminal obtains control information sent by the second terminal, and controls, according to the control information, a first visual light source on a local rotatable platform to rotate, so that a target indicated by the first visual light source is consistent with a target displayed by a display corresponding to the second terminal, thereby implementing control over the local first visual light source of the first terminal by the second terminal, eliminating a communication obstacle, and improving user experience of participants in the video conference.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a method for controlling a visual light source, a terminal, and a video conference system.

Figure 1:
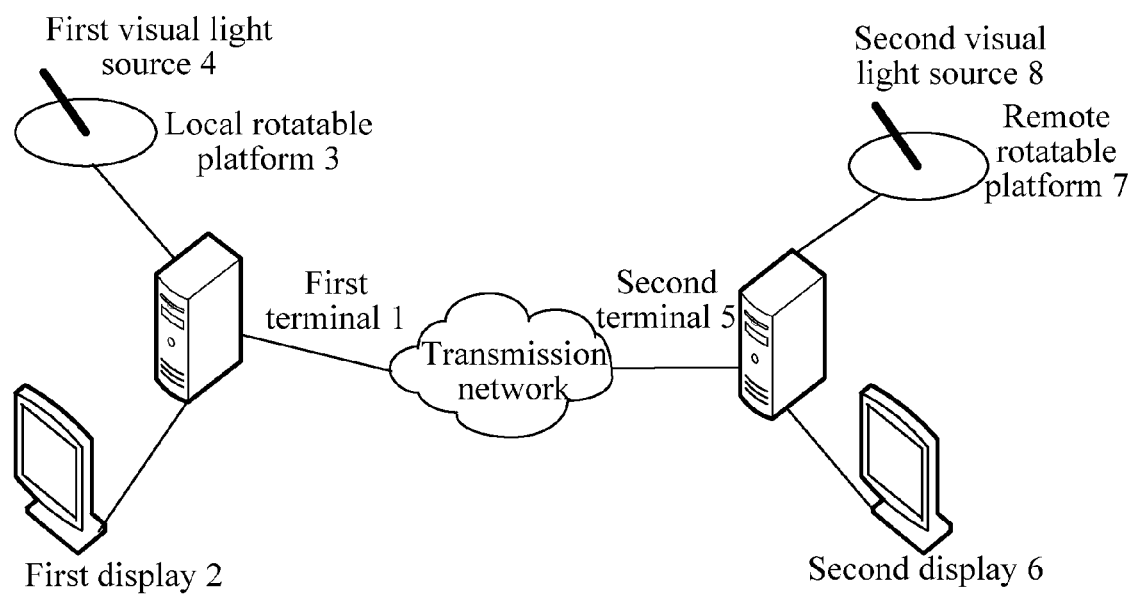
FIG. 1 is a schematic diagram of a video conference networking architecture according to an embodiment of the present invention.

The method provided by the embodiments of the present invention may be based on a video conference networking architecture shown in FIG. 1, where FIG. 1 is a schematic diagram of a video conference networking architecture according to an embodiment of the present invention. A first terminal 1, a first display 2, a local rotatable platform 3, and a first visual light source 4 in FIG. 1 are near-end devices of a video conference; a second terminal 5, a second display 6, a remote rotatable platform 7, and a second visual light source 8 are far-end devices of the video conference; and a local participant and a remote participant conduct the video conference by using the foregoing devices.

The first display 2 and the local rotatable platform 3 are separately connected to the first terminal 1, the first visual light source 4 is located on the local rotatable platform 3, and the first display 2 is a display corresponding to the first terminal 1. The second display 6 and the remote rotatable platform 7 are separately connected to the second terminal 5, the second visual light source 8 is located on the remote rotatable platform 7, and the second display 6 is a display corresponding to the second terminal 5. The first terminal 1 and the second terminal 5 may specifically be but not limited to video conference terminals, but the present invention is not limited thereto; and both the first terminal 1 and the second terminal 5 can be connected to a transmission network by using an Internet Protocol (IP) line or an E1 line, so as to implement mutual communication. Both the local rotatable platform 3 and the remote rotatable platform 7 can rotate up and down and left and right. Both the local rotatable platform 3 and the remote rotatable platform 7 can be provided with rotation power by using a motor, and can rotate horizontally and vertically by controlling a gear. The rotatable platform may be a rotatable platform of a local camera.

In order to make the objectives, technical solutions and advantages of the present invention clearer, the embodiments of the present invention are described in detail in the following with reference to the accompanying drawings.

Embodiment 1

Figure 2:
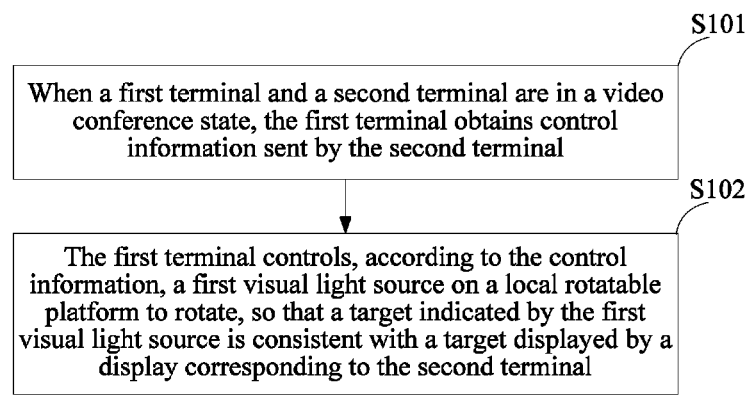
FIG. 2 is a flowchart of an embodiment of a method for controlling a visual light source according to Embodiment 1 of the present invention.

Referring to FIG. 2, FIG. 2 is a flowchart of an embodiment of a method for controlling a visual light source according to Embodiment 1 of the present invention. The method for controlling a visual light source includes:

S101: When a first terminal and a second terminal are in a video conference state, the first terminal obtains control information sent by the second terminal.

S102: The first terminal controls, according to the control information, a first visual light source on a local rotatable platform to rotate, so that a target indicated by the first visual light source is consistent with a target displayed by a display corresponding to the second terminal.

In this embodiment, when a first terminal and a second terminal are in a video conference state, the first terminal receives control information sent by the second terminal, and controls, according to the control information, a first visual light source on a local rotatable platform to rotate, so that a target indicated by the first visual light source is consistent with a target displayed by a display corresponding to the second terminal, thereby implementing control over the local first visual light source of the first terminal by the second terminal, eliminating a communication obstacle, and improving user experience of participants in the video conference.

Embodiment 2

Figure 3:
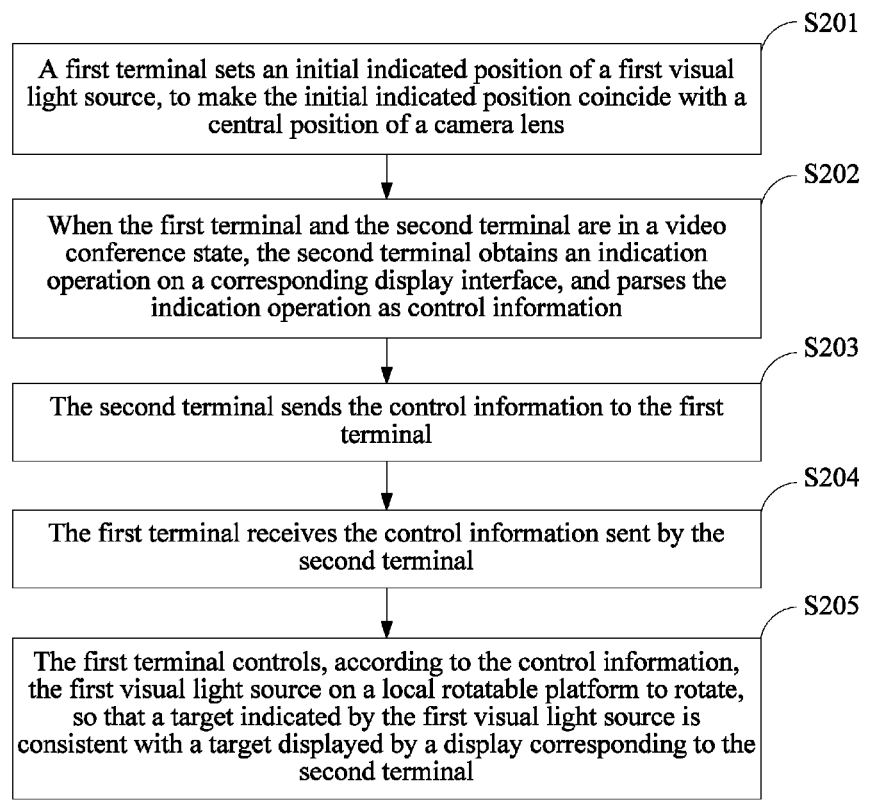
FIG. 3 is a flowchart of an embodiment of a method for controlling a visual light source according to Embodiment 2 of the present invention.

Referring to FIG. 3, FIG. 3 is a flowchart of an embodiment of a method for controlling a visual light source according to Embodiment 2 of the present invention. In this embodiment, detailed description is provided by using a first terminal and a second terminal being in a video conference state as an example, where the first terminal acts as a local terminal in a video conference, and the second terminal acts as a remote terminal in the video conference.

The method for controlling a visual light source includes:

S201: The first terminal sets an initial indicated position of a first visual light source, to make the initial indicated position coincide with a central position of a camera lens.

In this step, after the first terminal is powered on, when a local first visual light source is started, the initial indicated position of the first visual light source is set first, to make the initial indicated position coincide with a central position of a local camera lens; specifically, the camera captures a first indicated position of the first visual light source, and it is determined whether the first indicated position coincides with the central position of the camera lens; and if not, the first indicated position of the first visual light source is adjusted to the central position of the camera lens, and the adjusted indicated position of the first visual light source is set as the initial indicated position.

In this embodiment, after the first terminal sets the initial indicated position of the first visual light source, the first terminal performs coordinate mapping according to an image captured by a local camera, where this coordinate provides a basis for the first terminal to subsequently control movement of the first visual light source.

Figure 4:
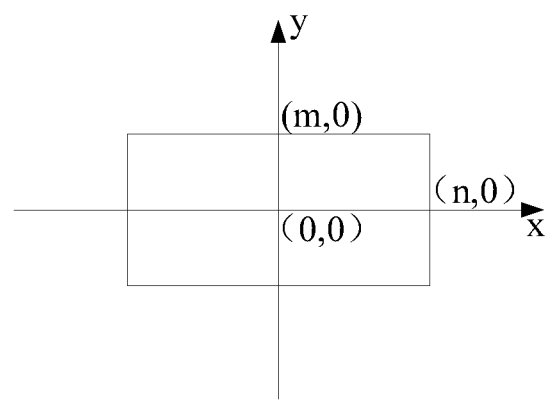
FIG. 4 is a schematic diagram of coordinate mapping according to Embodiment 2 of the present invention.

The coordinate mapping is specifically a coordinate system (x, y) is established with an origin (0, 0) being the central position of the camera lens, that is, the initial indicated position of the first visual light source, where a minimum movement step size by which a rotatable platform where the first visual light source is located can move is z, and the first visual light source needs to perform n movements with the minimum movement step size z, to horizontally move from a leftmost end of the image to the central position, and the first visual light source needs to perform m movements with the minimum movement step size z, to vertically move from an uppermost end of the image to the central position. A schematic diagram of coordinate mapping is shown in FIG. 4.

In the video conference, the first terminal and the second terminal are peer ends to each other. The second terminal also needs to perform coordinate mapping according to an image displayed on a second display corresponding to the second terminal. A method for the second terminal to perform coordinate mapping is similar to the method for the first terminal to perform coordinate mapping, and will not be repeated herein. For details, reference may be made to the foregoing description. The image displayed on the second display is the image captured by the local camera of the first terminal; and in this way, coordinates obtained after the first terminal and the second terminal perform coordinate mapping are kept consistent.

S202: When the first terminal and the second terminal are in the video conference state, the second terminal obtains an indication operation on a corresponding display interface, and parses the indication operation as control information.

When the first terminal and the second terminal are in the video conference state, a remote participant uses a mouse, a second visual light source, or a wireless transmission apparatus to perform the indication operation on a target on the display interface of the second display; the second terminal obtains the indication operation on the display interface, where the indication operation includes a stop operation and a movement operation. The stop operation is an operation in which the remote participant directly makes the mouse, the second visual light source, or the wireless transmission apparatus stop on the target; and the movement operation is an operation in which the remote participant moves the mouse, the second visual light source, or the wireless transmission apparatus to the target.

The second terminal parses the indication operation as control information; and specifically, when the indication operation is a stop operation, the second terminal performs coordinate mapping according to a position corresponding to the stop operation, to obtain coordinate information of the target displayed on the second display, where the coordinate information includes coordinate information of the mouse, indication coordinate information of the second visual light source, or indication coordinate information of the wireless transmission apparatus. When the indication operation is a movement operation, the second terminal performs coordinate mapping according to a movement track of the movement operation, to obtain information about the movement track of the target displayed on the second display, where the information about the movement track includes information about the movement track of the mouse, information about the movement track of the second visual light source, and information about the movement track of the wireless transmission apparatus.

In this embodiment, the second terminal may also capture a gesture of a local participant by using the local camera, generate a corresponding mouse-like icon on the display interface of the second display, and simulate a hand of the local participant as a mouse; and a function of the hand, in a process of movement, is similar to a function of a mouse, which will not be further described herein. Accordingly, the coordinate information may further include indication coordinate information of the gesture; and the information about the movement track may further include the information about the movement track of the gesture.

In this embodiment, that the second terminal obtains an indication operation on a corresponding display interface may further include that the second terminal obtains an indication operation on a target area on the display interface, where the target area is an area that is captured on the display interface by a user.

Specifically, the second terminal captures, on the display interface corresponding to the second terminal, a target area on which precise target indication needs to be performed, and displays the target area on another screen, or displays the target area in another window of the second terminal. The second terminal performs target indication on the target area in a manner of a mouse or a touchscreen, and obtains an indication operation on an interface where the target area is located, where the indication operation includes a stop operation and a movement operation. The second terminal may further zoom in and/or zoom out the target area, to obtain a more precise indicated target.

The second terminal parses the indication operation on the target area as the control information for the target area; and the second terminal converts the control information for the target area to control information for the display interface.

In an actual application, a method for the second terminal to parse the indication operation on the target area as control information for the target area is similar to the method for the second terminal to parse the indication operation on the display interface corresponding to the second terminal as control information, which will not be repeated herein. For details, refer to the foregoing relevant description. After the second terminal parses the control information for the target area, the second terminal performs coordinate conversion on the control information for the target area, that is, converts coordinates in a subimage of an original image to coordinates in the original image, to obtain the control information for the display interface of the second display, so that the obtained indicated target is more precise.

For example, when a sand table is displayed on the display interface of the second display, the second terminal may capture an area on the sand table as the target area, magnify the target area, perform precise target indication, and after performing parsing, obtain coordinate information of a second indicated target on the display interface through corresponding coordinate conversion.

S203: The second terminal sends the control information to the first terminal.

In this step, the second terminal sends the control information to the first terminal, where the control information includes coordinate information of a target displayed on the second display and the information about the movement track of the target displayed on the second display.

S204: The first terminal receives the control information sent by the second terminal.

S205: The first terminal controls, according to the control information, the first visual light source on a local rotatable platform to rotate, so that the target indicated by the first visual light source is consistent with a target displayed by a display corresponding to the second terminal.

In this step, when the control information is the coordinate information of the target displayed by the display corresponding to the second terminal, that is, the control information is the coordinate information of the target displayed on the second display, the first terminal rotates the first visual light source on the local rotatable platform from a first position to a position corresponding to the coordinate information, so that the target indicated by the first visual light source is consistent with the target displayed on the second display, where a distance from the first position to the position corresponding to the coordinate information is longer than the minimum movement step size of the rotatable platform where the first visual light source is located, and the first position may be the initial indicated position.

For example, when $m=10$, $n=15$, and $z=1$, the first position of the first visual light source is $(0, 0)$, and the coordinate information of the indicated target is $(3, 4)$, the first terminal moves the first visual light source on the local rotatable platform from $(0, 0)$ to a position $(3, 4)$, so that the target indicated by the first visual light source is consistent with the target displayed on the second display, where a distance from $(0, 0)$ to $(3, 4)$ is $5>1$, which meets a rotation requirement of the rotatable platform where the first visual light source is located. This embodiment does not limit a track of the first visual light source moving from $(0, 0)$ to $(3, 4)$; and in this embodiment, the first position of the first visual light source may not be the initial indicated position $(0, 0)$.

When the control information is the information about the movement track of the target displayed on the second display, the first terminal moves the first visual light source on the local rotatable platform from the first position to a start point position of the movement track, where a distance from the first position to the start point position of the movement track is longer than the minimum movement step size of the rotatable platform where the first visual light source is located, and the first position may be the initial indicated position; and the first terminal controls the first visual light source to simulate the movement track from the start point position of the movement track to an end point position of the movement track, so that the target indicated by the first visual light source is consistent with the target displayed on the second display, where a distance from the start point position to the end point position of the movement track is longer than the minimum movement step size of the rotatable platform where the first visual light source is located.

For example, when m=10, n=15, and z=1, the first position of the first visual light source is (1, 1), the movement track of the target displayed on the second display is to move from a start point (2, 2) to an end point (5, 6), the first terminal moves the first visual light source from (1, 1) to (2, 2), where a distance from (1, 1) to (2, 2) is $\sqrt{2}>1$, which meets the rotation requirement of the rotatable platform where the first visual light source is located. The first terminal controls the first visual light source to simulate the movement track from (2, 2) to the end point (5, 6), where a distance from (2, 2) to (5, 6) is 5>1, which meets the rotation requirement of the rotatable platform where the first visual light source is located. In this embodiment, the first position of the first visual light source may also be the initial indicated position.

In this embodiment, that the first terminal controls, according to the control information, the first visual light source on the local rotatable platform to rotate, so that the target indicated by the first visual light source is consistent with the target displayed on the second display specifically includes that the first terminal controls, according to the control information, the first visual light source on the local rotatable platform to rotate; the first terminal obtains the target indicated by the first visual light source, which is captured by a camera; and the first terminal determines whether the target indicated by the first visual light source is consistent with the target displayed on the second display, and if not, correcting the first visual light source, so that the target indicated by the first visual light source is consistent with the target displayed on the second display.

In this step, after the first terminal controls, according to the control information, the first visual light source on the local rotatable platform to rotate, the indicated position of the first visual light source further needs to be corrected, so that the indicated position of the first visual light source is more precise.

When the control information is the information about the movement track of the target displayed on the second display, various points of the movement track need to be corrected in real time according to the foregoing correction method, so as to ensure accuracy for the first visual light source to simulate the movement track.

Optionally, in this embodiment, the first terminal may further, during movement of the first visual light source, implement protection of eyes of all local participants by turning on and turning off the first visual light source; and specifically, after the first visual light source is turned on, before the first terminal sets the initial indicated position of the first visual light source, the local camera performs recognition of human faces of the local participants, and determines multiple preset areas where the eyes of all local participants are located; and the first terminal obtains and prerecords the multiple preset areas where the eyes of all participants captured by the local camera are located, and periodically refreshes the multiple preset areas where the eyes of all participants are located.

Optionally, the method in this embodiment further includes that during rotation of the first visual light source, when the indicated position of the first visual light source is located in any area of the multiple preset areas, the first terminal turns off the first visual light source; and when the indicated position of the first visual light source is not located in any area of the multiple preset areas, the first terminal turns on the first visual light source.

Any area of the multiple preset areas may be set according to the following method, and specifically: the preset area is set by using a human face of a local participant as a model, using cheeks as left and right boundaries, and using eyebrows and cheekbones as upper and lower boundaries; however, the method is not limited to this, and as long as the preset area that is set can ensure that the eyes of all local participants are not directly irradiated by the visual light source, the method falls within the protection scope of the embodiments of the present invention, which will not be repeated herein.

Optionally, the second terminal turns on or turns off the first visual light source according to the gesture of the local participant captured by the camera.

Specifically, the second terminal may parse the gesture of the local participant captured by the camera, to obtain gesture control instruction information, where the gesture control instruction information includes information about turning on the first visual light source or information about turning off the first visual light source; and the gesture control instruction information corresponds to the gesture in a one-to-one manner.

For example, a gesture of a participant captured by the camera is an "OK" gesture, the second terminal parses the "OK" gesture as the information about turning on the first visual light source, and sends the information about turning on the first visual light source to the first terminal, and the first terminal turns on the first visual light source according to the information about turning on the first visual light source.

In description in the foregoing embodiment, each end of the video conference has only one visual light source, but this embodiment is not limited thereto. In this embodiment, multiple visual light sources may further be controlled to perform target indication, and specifically, may separately control the multiple visual light sources by numbering the multiple visual light sources; or implement control of the multiple visual light sources by performing multi-point touch on the touchscreen. However, a method for controlling each visual light source of the multiple visual light sources is similar to the method described in the foregoing embodiment, which will not be repeated herein. For details, reference can be made to the description in the foregoing embodiment.

In this embodiment, when a first terminal and a second terminal are in a video conference state, the first terminal receives control information sent by the second terminal, and controls, according to the control information, a first visual light source on a local rotatable platform to rotate, so that a target indicated by the first visual light source is consistent with a target displayed by a display corresponding to the second terminal, thereby implementing control over the local first visual light source of the first terminal by the second terminal, eliminating a communication obstacle, and improving user experience of participants in the video conference.

In addition, this embodiment can further prevent the visual light source, in a movement process, from harming human eyes. This embodiment can further perform real-time correction in the movement process of the visual light source, so that indication of the visual light source is more precise.

Embodiment 3

Figure 5:
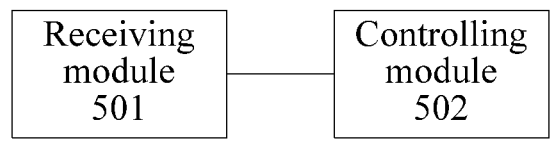
FIG. 5 is a first schematic structural diagram of a terminal embodiment according to Embodiment 3 of the present invention.

Referring to FIG. 5, FIG. 5 is a first schematic structural diagram of a terminal embodiment according to Embodiment 3 of the present invention. The terminal includes: a receiving module 501 configured to, when a first terminal and a second terminal are in a video conference state, receive control information sent by the second terminal; and a controlling module 502 configured to control, according to the control information, a first visual light source on a local rotatable platform to rotate, so that a target indicated by the first visual light source is consistent with a target displayed by a display corresponding to the second terminal.

Functions of the receiving module 501 and the controlling module 502 may be specifically implemented by a central processing unit (CPU) of a video-conferencing terminal.

Figure 6:
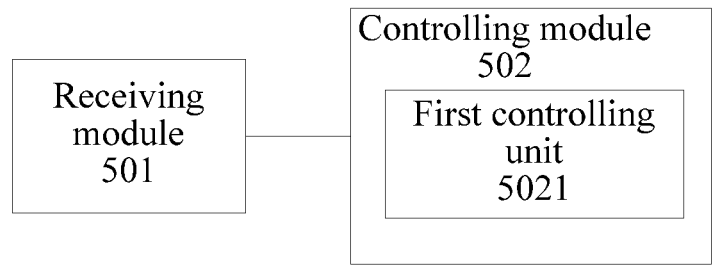
FIG. 6 is a second schematic structural diagram of a terminal embodiment according to Embodiment 3 of the present invention.

Optionally, the controlling module 502 includes a first controlling unit 5021. Referring to FIG. 6, FIG. 6 is a second schematic structural diagram of a terminal embodiment according to Embodiment 3 of the present invention.

The first controlling unit 5021 is configured to, when the control information is coordinate information of the target displayed by the display corresponding to the second terminal, rotate, according to the coordinate information, the first visual light source on the local rotatable platform from a first position to a position corresponding to the coordinate information, where a distance from the first position to the position corresponding to the coordinate information is longer than a minimum movement step size of the rotatable platform where the first visual light source is located.

Figure 7:
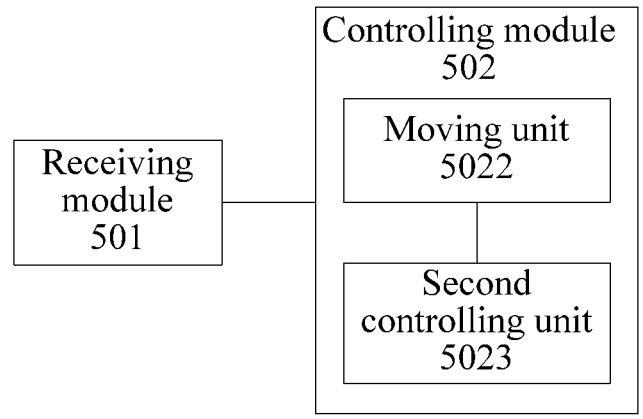
FIG. 7 is a third schematic structural diagram of a terminal embodiment according to Embodiment 3 of the present invention.

Optionally, in another implementation manner of this embodiment, the controlling module 502 includes a moving unit 5022 and a second controlling unit 5023. Referring to FIG. 7, FIG. 7 is a third schematic structural diagram of a terminal embodiment according to Embodiment 3 of the present invention.

The moving unit 5022 is configured to, when the control information is information of a movement track of the target displayed by the display corresponding to the second terminal, move the first visual light source on the local rotatable platform from the first position to a start point position of the movement track, where a distance from the first position to the start point position of the movement track is longer than the minimum movement step size of the visual light source.

The second controlling unit 5023 is configured to control the first visual light source to simulate the movement track from the start point position of the movement track to an end point position of the movement track, where a distance from the start point position of the movement track to the end point position of the movement track is longer than the minimum movement step size of the first visual light source.

Figure 8:
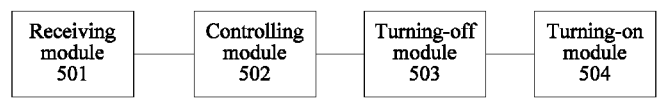
FIG. 8 is a fourth schematic structural diagram of a terminal embodiment according to Embodiment 3 of the present invention.

Optionally, on the basis of the foregoing implementation manner of this embodiment, the first terminal further includes a turning-off module 503 and a turning-on module 504. Referring to FIG. 8, FIG. 8 is a fourth schematic structural diagram of a terminal embodiment according to Embodiment 3 of the present invention.

The turning-off module 503 is configured to, during rotation of the first visual light source, if an indicated position of the first visual light source is located in any area of multiple preset areas, turn off the first visual light source, where the preset area is an area where eyes of the participant are located and which is prerecorded by the first terminal.

The turning-on module 504 is configured to, when the indicated position of the first visual light source is not located in any area of the multiple preset areas, turn on the first visual light source.

Functions of the turning-off module 503 and the turning-on module 504 may also be implemented by a CPU and an image processing device of a video-conferencing terminal.

In this embodiment, the terminal is capable of performing the steps of the method for controlling a visual light source in Embodiment 2, which will not be repeated herein. For details, reference may be made to the foregoing relevant description.

In this embodiment, when a first terminal and a second terminal are in a video conference state, control information sent by the second terminal is obtained, and a first visual light source on a local rotatable platform is controlled, according to the control information, to rotate, so that a target indicated by the first visual light source is consistent with a target displayed by a display corresponding to the second terminal, thereby implementing control over the local first visual light source by the remote second terminal, eliminating a communication obstacle, and improving user experience of participants in a video conference.

In addition, this embodiment can further prevent the visual light source, in a movement process, from harming human eyes. This embodiment can further perform real-time correction in the movement process of the visual light source, so that indication of the visual light source is more precise.

Embodiment 4

Figure 9:
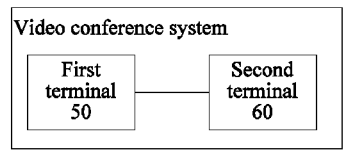
FIG. 9 is a schematic structural diagram of a video conference system embodiment according to Embodiment 4 of the present invention.

Referring to FIG. 9, FIG. 9 is a schematic structural diagram of a video conference system embodiment according to Embodiment 4 of the present invention. The video conference system includes a first terminal 50 and a second terminal 60.

The first terminal 50 is configured to obtain control information sent by the second terminal; and control, according to the control information, a first visual light source on a local rotatable platform to rotate, so that a target indicated by the first visual light source is consistent with a target displayed by a display corresponding to the second terminal.

The controlling, according to the control information, a first visual light source on a local rotatable platform to rotate includes: when the control information is coordinate information of the target displayed by the display corresponding to the second terminal, rotating, according to the coordinate information, the first visual light source on the local rotatable platform from a first position to a position corresponding to the coordinate information, where a distance from the first position to the position corresponding to the coordinate information is longer than a minimum movement step size of the rotatable platform where the first visual light source is located; or, when the control information is information of a movement track of the target displayed by the display corresponding to the second terminal, moving the first visual light source on the local rotatable platform from the first position to a start point position of the movement track, where a distance from the first position to the start point position of the movement track is longer than the minimum movement step size of the rotatable platform where the visual light source is located; and controlling the first visual light source to simulate the movement track from the start point position of the movement track to an end point position of the movement track, where a distance from the start point position of the movement track to the end point position of the movement track is longer than the minimum movement step size of the rotatable platform where the first visual light source is located.

The first terminal is further configured to, during rotation of the first visual light source, when an indicated position of the first visual light source is located in any area of multiple preset areas, turn off the first visual light source, where the preset area is an area where eyes of the participant are located and which is prerecorded by the first terminal; and when the indicated position of the first visual light source is not located in any area of the multiple preset areas, turn on the first visual light source.

In this embodiment, when a first terminal and a second terminal are in a video conference state, the first terminal obtains control information sent by the second terminal, and controls, according to the control information, a first visual light source on a local rotatable platform to rotate, so that a target indicated by the first visual light source is consistent with a target displayed by a display corresponding to the second terminal, thereby implementing control over the local first visual light source of the first terminal by the second terminal, eliminating a communication obstacle, and improving user experience of participants in the video conference.

In addition, this embodiment can further prevent the visual light source, in a movement process, from harming human eyes. This embodiment can further perform real-time correction in the movement process of the visual light source, so that indication of the visual light source is more precise.

It should be noted that all embodiments in this specification are described in a progressive manner; what each embodiment emphasizes is a difference from another embodiment; and mutual reference may be made to a same or similar part between the embodiments. The device embodiment is described briefly because it is basically similar to the method embodiments, and for relevant parts, reference may be made to some description of the method embodiments.

It should be noted that in the specification, relational terms such as first and second are used only to differentiate one entity or operation from another entity or operation, and do not require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for controlling a visual light source, comprising:
   receiving, by a first terminal, control information sent by a second terminal when the first terminal and the second terminal are in a video conference state;
   performing, by the first terminal, coordinate mapping of an image captured by a local camera coupled to the first terminal to generate coordinate information of a display corresponding to the first terminal; and
   controlling, by the first terminal according to the control information, a rotational position of a first visual light source on a local rotatable platform to rotate such that a target indicated by the first visual light source on the display corresponding to the first terminal is consistent with a target displayed by a display corresponding to the second terminal.

2. The method according to claim 1, wherein the control information is coordinate information of the target displayed by the display corresponding to the second terminal, and wherein controlling, by the first terminal according to the control information, the first visual light source on the local rotatable platform to rotate comprises rotating, by the first terminal according to the coordinate information, the first visual light source on the local rotatable platform from a first position to a position corresponding to the coordinate information, wherein a distance from the first position to the position corresponding to the coordinate information is longer than a minimum movement step size of the rotatable platform where the first visual light source is located.

3. The method according to claim 1, wherein the control information is information of a movement track of the target displayed by the display corresponding to the second terminal, and wherein controlling, by the first terminal according to the control information, the first visual light source on the local rotatable platform to rotate comprises:
   moving, by the first terminal, the first visual light source on the local rotatable platform from a first position to a start point position of the movement track, wherein a distance from the first position to the start point position of the movement track is longer than a minimum movement step size of the rotatable platform where the first visual light source is located; and
   controlling, by the first terminal, the first visual light source to simulate the movement track from the start point position of the movement track to an end point position of the movement track, wherein a distance from the start point position of the movement track to the end point position of the movement track is longer than the minimum movement step size of the rotatable platform where the first visual light source is located.

4. The method according to claim 1, wherein the method further comprises:
   turning off, by the first terminal, the first visual light source during rotation of the first visual light source when an indicated position of the first visual light source is located in any area of multiple preset areas, wherein the preset area is an area where eyes of a participant are located and which is pre-recorded by the first terminal; and
   turning on, by the first terminal, the first visual light source when the indicated position of the first visual light source is not located in any area of the multiple preset areas.

5. A first terminal comprising:
   a receiver configured to receive control information sent by a second terminal when the first terminal and the second terminal are in a video conference state; and
   a computer processor coupled to the receiver and configured to:
      perform coordinate mapping of an image captured by a visual input of the first terminal to generate coordinate information of a display corresponding to the first terminal; and
      control, according to the control information, a rotational position of a first visual light source on a local rotatable platform to rotate such that a target indicated by the first visual light source on the display corresponding to the first terminal is consistent with a target displayed by a display corresponding to the second terminal.

6. The first terminal according to claim 5, wherein the computer processor is further configured to rotate, according to coordinate information, the first visual light source on the local rotatable platform from a first position to a position corresponding to the coordinate information when the control information is coordinate information of the target displayed by the display corresponding to the second terminal, and wherein a distance from the first position to the position corresponding to the coordinate information is longer than a minimum movement step size of the rotatable platform where the first visual light source is located.

7. The first terminal according to claim 5, wherein the computer processor is further configured to:
move the first visual light source on the local rotatable platform from a first position to a start point position of a movement track when the control information is information of the movement track of the target displayed by the display corresponding to the second terminal, wherein a distance from the first position to the start point position of the movement track is longer than a minimum movement step size of the rotatable platform where the visual light source is located; and
control the first visual light source to simulate the movement track from the start point position of the movement track to an end point position of the movement track, and wherein a distance from the start point position of the movement track to the end point position of the movement track is longer than the minimum movement step size of the rotatable platform where the first visual light source is located.

8. The first terminal according to claim 5, wherein the computer processor is further configured to:
turn off the first visual light source during rotation of the first visual light source when an indicated position of the first visual light source is located in any area of multiple preset areas, wherein the preset area is an area where eyes of a participant are located and which is pre-recorded by the first terminal; and
turn on the first visual light source when the indicated position of the first visual light source is not located in any area of the multiple preset areas.

9. A video conference system, comprising:
a first terminal; and
a second terminal,
wherein the first terminal is configured to:
obtain control information sent by the second terminal;
perform coordinate mapping of an image captured by a visual input of the first terminal to generate coordinate information of a display corresponding to the first terminal; and
control, according to the control information, a rotational position of a first visual light source on a local rotatable platform to rotate such that a target indicated by the first visual light source on the display corresponding to the first terminal is consistent with a target displayed by a display corresponding to the second terminal.

10. The video conference system of claim 9, wherein the control information indicates a movement track corresponding to the second terminal, and wherein the first terminal controls the rotational position of the first visual light source to follow the movement track.

11. The video conference system of claim 9, wherein the control information indicates a desired rotational position of the first visual light source, and wherein the first terminal controls the first visual light source to rotate the first visual light source horizontally and vertically according to the desired rotational position of the first visual light source.

12. The video conference system of claim 9, wherein the control information corresponds to user input on the display corresponding to the second terminal.

13. The method according to claim 1, wherein the first visual light source is rotatable in a vertical direction and in a horizontal direction.

14. The method according to claim 1, wherein the control information indicates a desired rotational position for the first visual light source, and wherein the desired rotational position corresponds to an input of the display corresponding to the second terminal.

15. The method according to claim 1, wherein before performing coordinate mapping of the image captured by the local camera coupled to the first terminal, the method further comprises:
determining whether an initial indicated position of the first visual light source is a central position of a lens of the local camera;
adjusting the initial indicated position of the first visual light source to an adjusted indicated position at the central position of the lens of the local camera when the initial indicated position of the first visual light source is not the central position of the lens of the local camera; and
setting the adjusted indicated position as the initial indicated position.

16. The method according to claim 4, wherein the preset area is pre-recorded by the first terminal by the local camera performing facial detection of local participants.

17. The first terminal according to claim 5, wherein the computer processor is further configured to rotate the first visual light source in a vertical direction and in a horizontal direction.

18. The first terminal according to claim 5, wherein the control information indicates a desired rotational position for the first visual light source, and wherein the desired rotational position corresponds to an input of the display corresponding to the second terminal.

19. The first terminal according to claim 5, wherein the computer processor is further configured to:
determine whether an initial indicated position of the first visual light source is a central position of a lens of the visual input of the first terminal;
adjust the initial indicated position of the first visual light source to an adjusted indicated position at the central position of the lens of the visual input of the first terminal when the initial indicated position of the first visual light source is not the central position of the lens of the visual input of the first terminal; and
set the adjusted indicated position as the initial indicated position.

20. The first terminal according to claim 8, wherein the preset area is pre-recorded by the first terminal by the visual input of the first terminal performing facial detection of local participants.

* * * * *